(12) United States Patent
Park et al.

(10) Patent No.: US 10,157,587 B2
(45) Date of Patent: Dec. 18, 2018

(54) POWER SUPPLY AND DISPLAY DEVICE USING THE SAME

(71) Applicant: LG Display Co., Ltd., Seoul (KR)

(72) Inventors: Mingyu Park, Seoul (KR); Soondong Cho, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 52 days.

(21) Appl. No.: 15/194,883

(22) Filed: Jun. 28, 2016

(65) Prior Publication Data

US 2017/0004800 A1 Jan. 5, 2017

(30) Foreign Application Priority Data

Jun. 30, 2015 (KR) ........................ 10-2015-0093666

(51) Int. Cl.
*G09G 3/36* (2006.01)
*H02M 3/04* (2006.01)
*G09G 3/20* (2006.01)
*H02M 3/156* (2006.01)

(52) U.S. Cl.
CPC ......... *G09G 3/3696* (2013.01); *G09G 3/2092* (2013.01); *G09G 3/3648* (2013.01); *H02M 3/04* (2013.01); *G09G 2300/0413* (2013.01); *G09G 2330/021* (2013.01); *G09G 2330/027* (2013.01); *H02M 3/156* (2013.01)

(58) Field of Classification Search
None
See application file for complete search history.

(56) References Cited

U.S. PATENT DOCUMENTS

2016/0078818 A1* 3/2016 Kang ................... G09G 3/3291
345/212

* cited by examiner

*Primary Examiner* — Ifedayo Iluyomade
(74) *Attorney, Agent, or Firm* — Morgan, Lewis & Bockius LLP

(57) ABSTRACT

A power supply and a display device using the same are provided. The power supply includes a logic voltage generator and a power voltage generator. The logic voltage generator generates an internal logic voltage based on an externally input voltage. The power voltage generator generates a plurality of power voltages based on the external input voltage. When the external input voltage is cut off, the power voltage generator stops outputting a drain voltage, and then stops outputting a half drain voltage.

7 Claims, 11 Drawing Sheets

POWER SUPPLY AND DISPLAY DEVICE USING THE SAME

This application claims the benefit of Korean Patent Application No. 10-2015-0093666, filed on Jun. 30, 2015, the entire contents of which is incorporated herein by reference for all purposes as if fully set forth herein.

BACKGROUND OF THE INVENTION

Field of the Invention

The present disclosure relates to a power supply and a display device using the same.

Discussion of the Related Art

With development of information technologies, there are increasing demands for a display device which allows a user to connect information. Accordingly, a Flat Panel Display (FPD), such as a Liquid Crystal Display (LCD), an Organic Light Emitting Diode Display (OLED), and a Plasma Display Panel (PDP), are widely used.

Some of the aforementioned display devices, for example, the LCD and the OLED, include: a display panel in which a plurality of subpixels are arranged in matrix; a driver which drives the display panel; a timing controller which controls the driver; and a power supply which generates power. The driver includes a gate driver for supplying a gate signal (or a scan signal) to the display panel, and a data driver for supplying a data signal to the display panel.

Once a gate signal or a data signal is supplied to the subpixels arranged in matrix, selected subpixels transmit or emit lights and thereby the aforementioned display devices is enabled to display an image.

The power supply generates and outputs power voltages necessary to drive a timing controller and a driver which are components for controlling and driving the display panel. The power supply stops outputting all voltages when an off signal (e.g., an Under Voltage Lock Out (UVLO) signal) falls, wherein the off signal occurs within the display device when the display device is power off (or turned off). At this point, even after the display device is power off, the voltages output from the power supply have to fall in a constant order and voltage differentials between them have to be maintained. However, when an existing power supply is used, the voltages falls in a random order and the voltage differentials are not maintained, thereby causing the reverse voltage phenomenon, damage to the display device, or reliability failure,

SUMMARY

Accordingly, the present invention is directed to a power supply and display device using the same that substantially obviate one or more of the problems due to limitations and disadvantages of the related art.

An object of the present invention is to provide a power supply and a display device having improved reliability.

Another object of the present invention is to provide a power supply and a display device wherein a supplied voltage can be maintained stable.

Another object of the present invention is to provide a power supply and a display device that can be easily and efficiently manufactured.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a power supply comprises a logic voltage generator and a power voltage generator. The logic voltage generator generates an internal logic voltage based on an externally input voltage. The power voltage generator generates a plurality of power voltages based on the external input voltage. When the external input voltage is cut off, the power voltage generator stops outputting a drain voltage, and then stops outputting a half drain voltage.

In another aspect, a display device comprises a display panel, a data driver, a timing controller, and a power supply. The image panel displays an image. The data driver supplies a data signal to the display panel. The timing controller controls the data driver. The power supply includes a logic voltage generator for generating an internal logic voltage based on an externally input voltage, and a power voltage generator for generating a plurality of power voltages based on the externally input voltage. When the externally input voltage is cut off, the power supply stops outputting a drain voltage, and then stops outputting a half drain voltage.

In another aspect, a display device comprises a display panel, a data driver, a timing controller, and a power supply. The display panel displays an image. The data driver supplies a data signal to the display panel. The timing controller controls the data driver. A first power supply includes a logic voltage generator for generating an internal logic voltage based on an externally input voltage, and a power voltage generator for generating a half drain voltage based on the externally input voltage. A second power supply includes a power voltage generator for generating a drain voltage based on the externally input voltage. When the externally input voltage is cut off, the half drain voltage may fall to a level of a ground power voltage after a time delay, as compared to the drain voltage.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to example embodiments of the present invention, examples of which are illustrated in the accompanying drawings.

Hereinafter, embodiments according to the present disclosure are described in detail with accompanying drawings.

With development of information technologies, there are increasing demands for a display device which allows a user to connect information. Accordingly, a Flat Panel Display (FPD), such as a Liquid Crystal Display (LCD), an Organic Light Emitting Diode Display (OLED), and a Plasma Display Panel (PDP), are widely used.

Some of the aforementioned display devices, for example, the LCD and the OLED, include: a display panel in which a plurality of subpixels are arranged in matrix; a driver which drives the display panel; a timing controller which controls the driver; and a power supply which generates power. The driver includes a gate driver for supplying a gate signal (or a scan signal) to the display panel, and a data driver for supplying a data signal to the display panel.

Once a gate signal or a data signal is supplied to the subpixels arranged in matrix, selected subpixels transmit or emit lights and thereby the aforementioned display devices is enabled to display an image.

Hereinafter, the present disclosure will be explained by taking an example of an LCD. However, it is obvious that the present disclosure is able to be applied not only to the LCD, but also to an OLED or the like.

Figure 1:
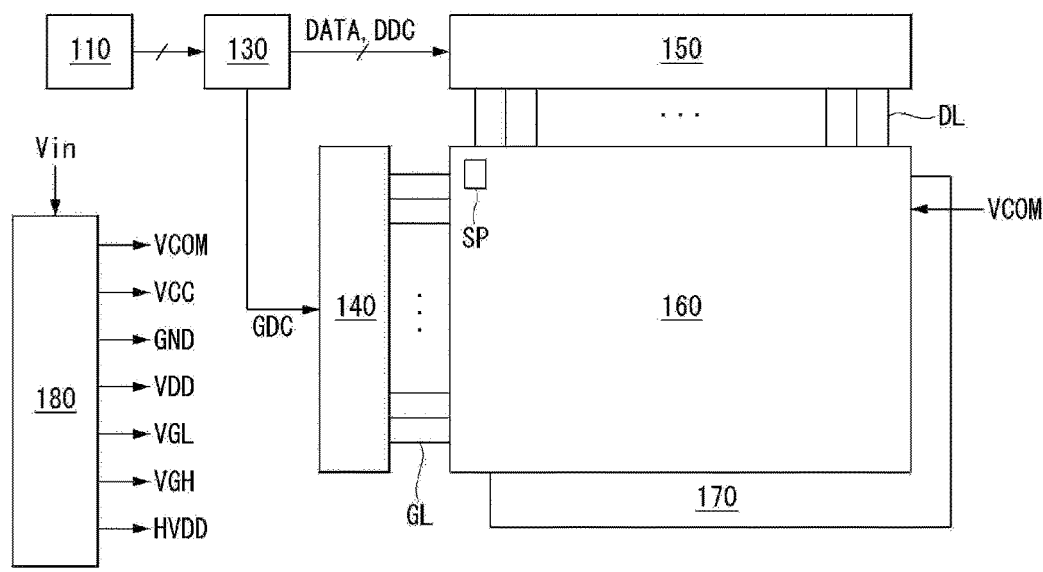
FIG. 1 is a block diagram illustrating a liquid crystal display (LCD) device.
Figure 2:
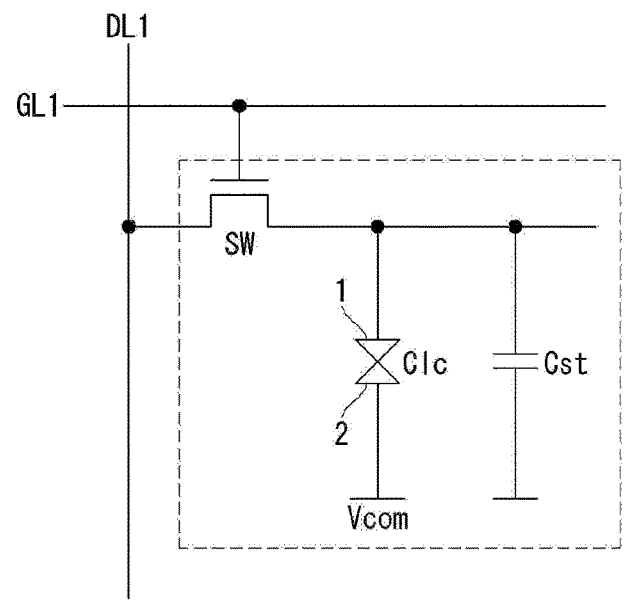
FIG. 2 is a circuit diagram illustrating a subpixel shown in FIG. 1.

FIG. 1 is a diagram illustrating a liquid crystal display (LCD), and FIG. 2 is a circuit diagram illustrating a subpixel shown in FIG. 1.

As illustrated in FIGS. 1 and 2, an LCD includes an image supply 110, a timing controller 130, a gate driver 140, a data driver 150, a liquid crystal panel 160, a back light unit 170, and a power supply 180.

The image supply 110 outputs an externally received data signal, an image data signal stored in an inner memory, and various drive signals. The image supply 110 supplies the data signals and various drive signals to the timing controller 130.

The timing controller 130 outputs a gate timing control signal GDC for controlling an operation timing of the gate driver 140, and a data timing control signal DDC for controlling an operation timing of the data driver 150. The timing controller 130 supplies the data driver 150 with a data signal (or a data voltage DATA) from the image processor 110, together with the data timing control signal DDC.

In response to the gate timing control signal GDC supplied from the timing controller 130, the gate driver 140 outputs a gate signal with shifting the level of a gate voltage. The gate driver 140 supplies the gate signal to subpixels SP included in the liquid crystal panel 160 through gate lines GL. The gate driver 140 is in the form of an Integrated Circuit (IC), or formed on the liquid crystal panel 160 using Gate-in-Panel (GIP) technology.

In response to the data timing control signal DDC supplied from the timing controller 130, the data driver 150 samples and latches a data signal DATA, converts the sampled and latched data signal DATA into the analog signal form corresponding to a gamma reference voltage, and outputs the result. The data driver 150 supplies the data signal DATA to the subpixels included in the liquid crystal panel 160 through data lines DL. The data driver 150 is in the form of an IC circuit.

The liquid crystal panel 160 displays an image in accordance with a gate signal supplied from the gate driver 140, a data signal DATA supplied from the data driver 150, and a common voltage VCOM supplied from the power supply 180. The liquid crystal panel 160 includes subpixels SP which control light provided through the back light unit 170.

For example, one subpixel includes a switching transistor SW, a storage capacitor Cst, and a liquid crystal layer Clc. The switching transistor SW includes a gate electrode connected to a gate line GL1, and a source electrode connected to a data line DL1. The storage capacitor Cst includes one end connected to a drain electrode of the switching transistor SW, and the other end connected to a common voltage line Vcom. The liquid crystal layer Clc is formed between a pixel electrode 1 connected to the drain electrode of the switching transistor SW and a common electrode 2 connected to the common voltage line Vcom.

Based on the structure of the pixel electrode 1 and the common electrode 2, the liquid crystal panel 160 is implemented in a Twisted Nematic (TN) mode, a Vertical Alignment (VA) mode, an In Plane Switching (IPS) mode, a Fringe Field Switching (FFS) mode, or an Electrically Controlled Birefringence (ECB) mode.

Using a light source which outputs light, the back light unit 170 provides light to the liquid crystal panel 160. The back light unit 170 includes: an Light Emitting Diode (LED); an LED driver which drives the LED; an LED substrate on which the LED is mounted; a light guide plate which converts lights output from the LED into a surface light source; a reflector which reflects light from the bottom of the light guide plate; and optical sheets which converge and diffuse light output from the light guide plate.

Based on an externally input voltage Vin, the power supply 180 may generate and output a plurality of power voltages which are to be supplied to at least one of the timing controller 130, the gate driver 140, the data driver 150, and the liquid crystal panel 160. For example, the plurality of the power voltages generated and output by the power supply 180 may be a common voltage VCOM, a first positive power voltage (or a collector voltage) VCC, a ground power voltage GND, a second power voltage (or a drain voltage) VDD, a gate low voltage VGL, a gate high voltage VGH, and a third power voltage (or a half drain voltage) HVDD.

However, aspects of the present disclosure are not limited thereto, because at least one of the aforementioned power voltages (e.g., the common voltage, the gate low voltage, or the gate high voltage) may be generated or output by an additional power unit (e.g., a level shifter) which is configured to be driven by a power voltage output from the power supply 180.

The aforementioned power supply 180 stops outputting the voltages at a time when an off signal (e.g., an Under Voltage Lock Out (UVLO) signal) falls, wherein the off signal occurs inside the power supply 180 when the liquid crystal display device is power off (or turned off).

In a case where the data driver 150 is configured with a process condition for outputting a high voltage, a power-off sequence of the second positive power voltage VDD, the third positive power voltage HVDD, and a gamma voltage in response to the power supply 180 being power off is not considered important. Meanwhile, the gamma voltage may be generated by an additional circuit which is disposed inside or outside the data driver 150. That is, the gamma voltage generating circuit may be located differently according to a configuration of the device, but the fact that gamma voltage is generated based on the third positive power voltage HVDD output from the power supply 180 is not changed.

However, if the data driver 150 is configured with a process condition for outputting a low voltage, a power-off sequence of the second positive power voltage VDD, the third positive power voltage HVDD, and the gamma voltage in response to the power supply 180 being power off is considered important.

According to an experiment result, the data driver 150 is highly likely to operate in an unstable state unless a falling order of voltages output from the power supply 180 and difference between the voltages are maintained consistently.

In the existing power supply used in the experiment, the voltages falls in an inconsistent order after the power supply is power off, and difference of the voltages is also not maintained consistently. It causes a reverse voltage phenomenon, damage to a device, such as a data driver, or reliability failure. Thus, improvement for solving the problem needs to be made.

Hereinafter, the present disclosure's distinct features from the existing power supply are described in detail.

Figure 3:
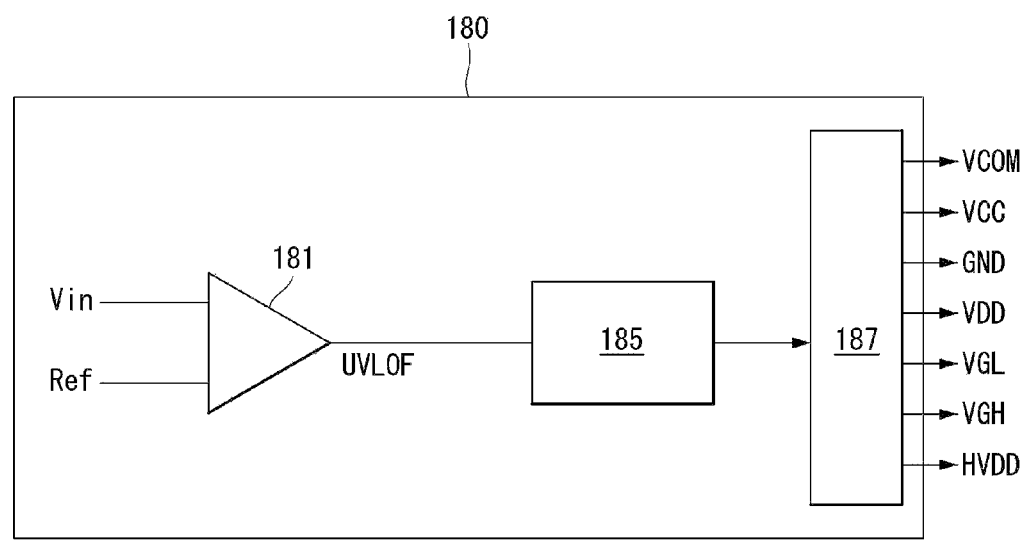
FIG. 3 is a diagram illustrating part of an existing power supply.
Figure 4:
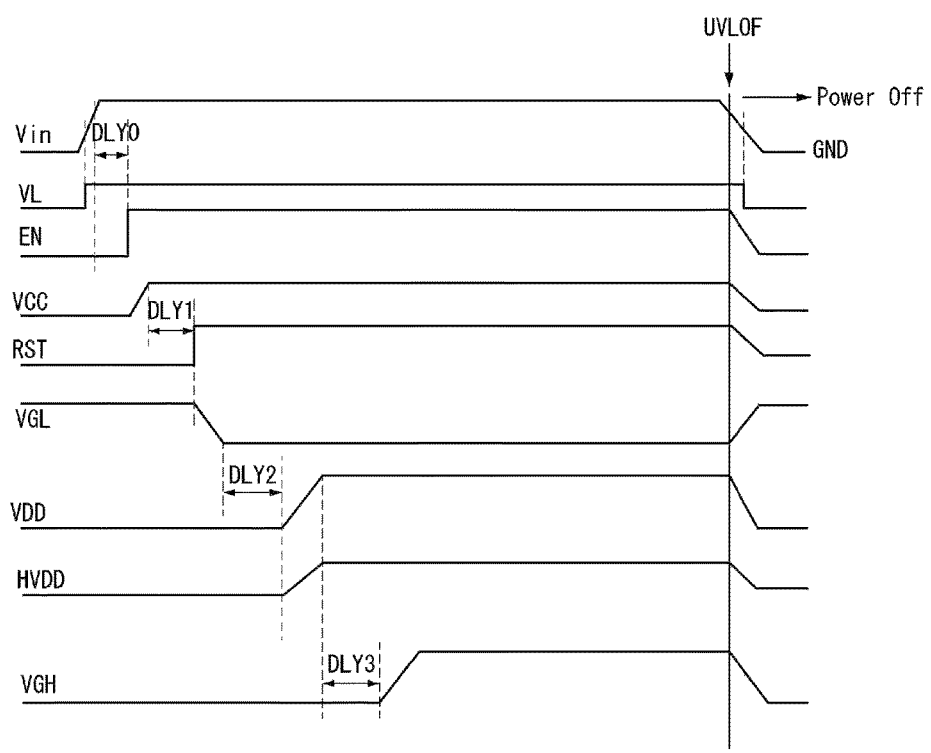
FIG. 4 is a waveform diagram illustrating power-off sequences shown when the existing power supply is power off.
Figure 5:
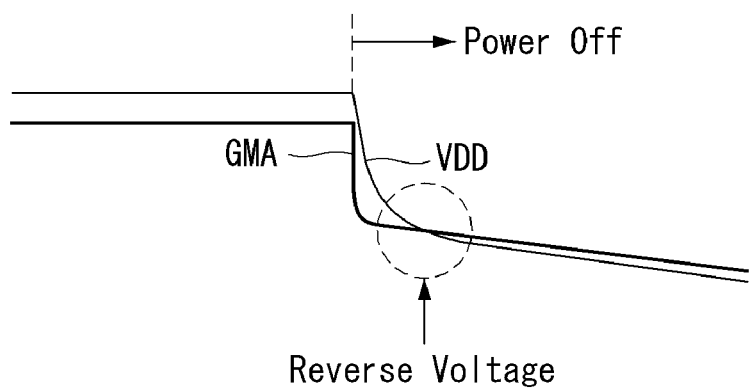
FIG. 5 is a waveform diagram illustrating a problem occurring when the existing power supply is power off.

FIG. 3 is s block diagram illustrating part of an existing power supply; FIG. 4 is a waveform diagram illustrating power-off sequences shown when the existing power supply is power off and FIG. 5 is a waveform diagram illustrating a problem occurring when the existing power supply is power off.

As illustrating FIG. 3, an existing power supply 180 includes an external voltage detector 181, a control signal generator 185, and a power voltage generator 187, The external voltage detector 181 compares an internally set reference voltage Ref with an externally input voltage Vin, and outputs an off signal (e.g., a UVLOF signal) when the externally input voltage Vin falls to or below internally set the reference voltage Ref. When the externally input voltage Vin is cut off or falls to or below internally set (a predetermined reference) reference voltage, the external voltage detector 181 outputs the off signal (e.g., a UVLOF signal). For example, the off signal (e.g., a UVLOF signal) may be configured to usually maintain a logic high level, and switch from the logic high level to a logic low level when the externally input voltage Vin falls to or below the internally set reference voltage Ref.

In accordance with the off signal (e.g., a UVLOF signal) of a logic low level output from the external voltage detector 181, the control signal generator 185 outputs a power control signal CS1 that stops the power voltage generator 187 from outputting voltages.

Based on the externally input voltage Vin, the power voltage generator 187 outputs a common voltage VCOM, a first positive power voltage VCC, a ground power voltage GND, a second positive power voltage VDD, a gate low voltage VGL, a gate high voltage VGH, and a third positive power voltage HVDD. In accordance with a power control signal CS1 output from the control signal generator 185, the power voltage generator 187 stops outputting all the voltages VCOM, VCC, GND, VDD, VGL, VGH, and HVDD.

FIG. 4, "VL" denotes an internal logic voltage of the power supply 180; RST denotes a reset signal of a timing controller; and "EN" denotes an operation activating signal of the power supply 180. In addition, DLY0~DLY3 are delay time and their values may be changed according to settings of a device.

Due to the above configuration, when the existing power supply 180 is power off, all the voltages VCOM, VCC, GND, VDD, VGL, VGH, and HVDD fall to a level of the ground power voltage GND by an off signal (e.g., a UVLOF signal). At this time, however, the falling order of the voltages VCOM, VCC, GND, VDD, VGL, VGH, and HVDD and difference thereof are not maintained consistently.

According to an experimental result, when the existing power supply 180 is power off, a reverse voltage phenomenon occurs to specific voltages (e.g., VDD and GMA) and this may cause damage to a device, such as a data driver, or reliability failure.

To solve the above problem, many experiments have been conducted and it is found that the problem could be addressed and/or prevented through the following embodiments.

<First Embodiment>

Figure 6:
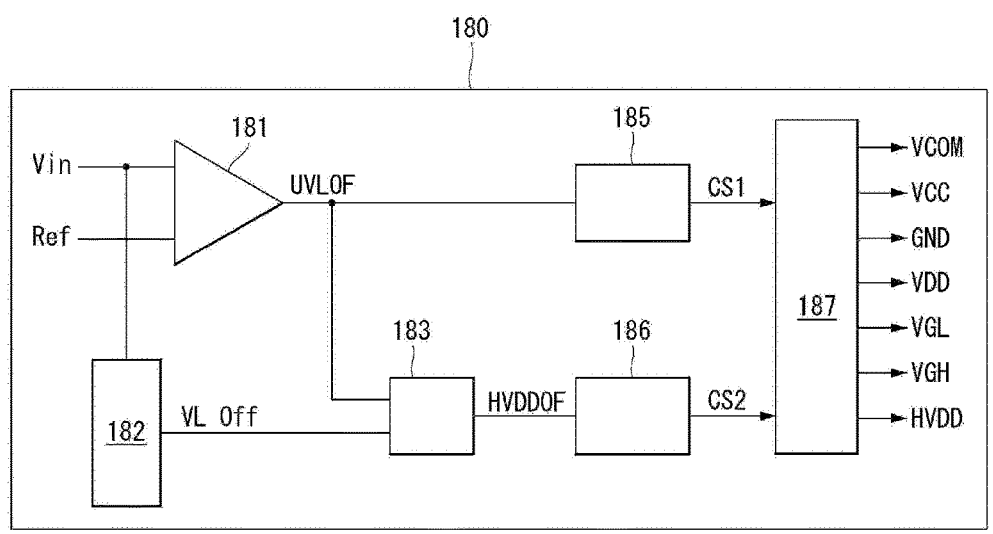
FIG. 6 is a block diagram illustrating part of a power supply according to a first embodiment of the present disclosure.
Figure 7:
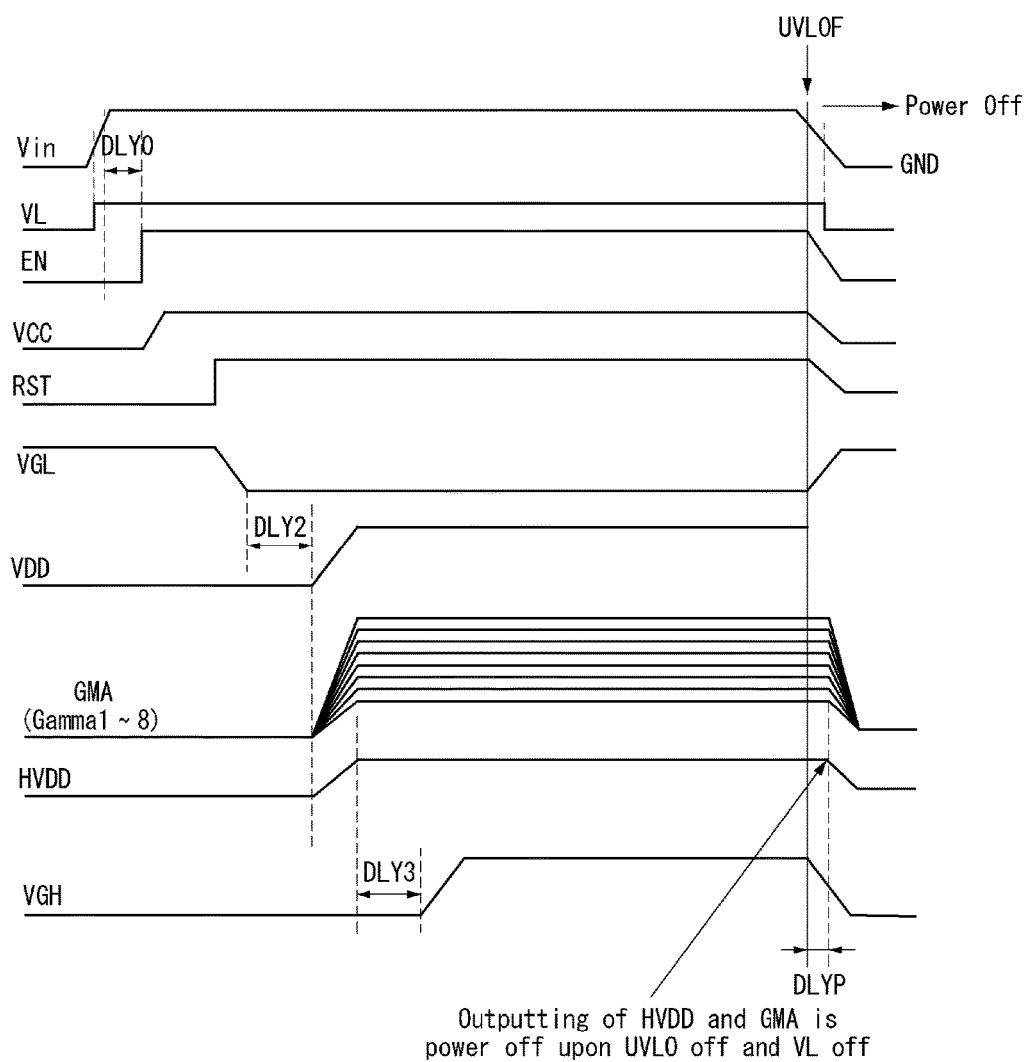
FIG. 7 is a waveform diagram illustrating power-off sequences shown when the power supply according to the first embodiment of the present disclosure is power off.
Figure 8:
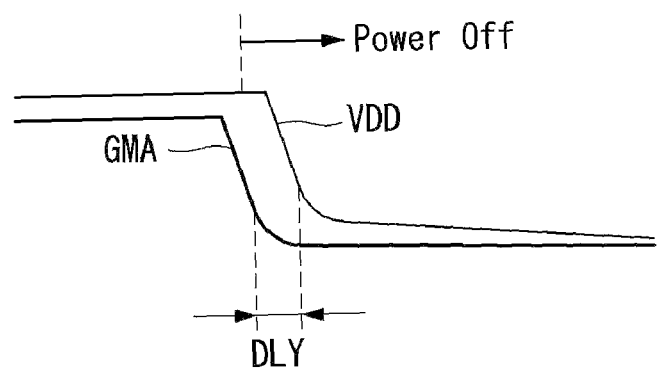
FIG. 8 is a waveform diagram illustrating improvement of the power supply according to the first embodiment of the present disclosure when the power supply is power off.

FIG. 6 is a block diagram illustrating part of a power supply according to a first embodiment of the present disclosure; FIG. 7 is a waveform diagram illustrating power-off sequences shown when the power supply according to the first embodiment of the present disclosure is power off; and FIG. 8 is a waveform diagram illustrating improvement shown when the power supply of the first embodiment of the present disclosure is power off As illustrated in FIGS. 6 and 8, a power supply according to the first embodiment of the present disclosure includes an external voltage detector 181, a logic voltage generator 182, an internal voltage detector 183, a first control signal generator 185, a second control signal generator 186, and a power voltage generator 187.

The external voltage detector 181 detects whether an externally input voltage Vin is normally being input. The external voltage detector 181 compares an internally set reference voltage Ref with an externally input voltage Vin, and outputs a first off signal (e.g., a UVLOF signal) when the externally input voltage Vin falls to or below the internally set reference voltage Ref. When the externally input voltage Vin is cut off or falls to or below the internally set reference voltage, the external voltage detector 181 outputs the first off signal (UVLOF). For example, the first off signal (e.g., a UVLOF signal) may be configured to usually maintain a logic high level and switch from the logic high level to a logic low level when the externally input voltage Vin falls to or below the internally set reference voltage Ref Based on the externally input voltage Vin, the logic voltage generator 182 generates an internal logic voltage which drives an internal circuit of the power supply 180. The internal logic voltage generated by the logic voltage generator 182 is used to drive at least one of the external voltage generator 181, the internal voltage detector 183, the first control signal generator 185, the second control signal generator 186, and the power voltage generator 187.

The internal voltage detector 183 detects whether an internal logic voltage generated by the logic voltage is normally being output. When the internal logic voltage output from the logic voltage generator 182 is cut off (VL Off), the internal voltage detector 183 generates a signal that controls the second control signal generator 186. For example, when the first off signal (e.g., a UVLOF signal) output from the external voltage detector 181 and an internal logic voltage output from the logic voltage generator 182 falls to a level corresponding to logic low, the internal voltage detector 183 may generate a signal that controls the second control signal generator 186.

In accordance with the first off signal (UVLOF) of a logic low level output from the external voltage detector 181, the first control signal generator 185 outputs a first power control signal CS1 that stops the power voltage generator 187 from outputting voltages. The external voltage detector 181 and the first control signal generator 185 may be defined as a first circuit unit.

In accordance with a second off signal (e.g., a HVDDOF signal) of a logic low level output from the internal voltage detector 183, the second control signal generator 185 outputs a second power control signal CS2 that stops the power voltage generator 187 from outputting voltages. The internal voltage detector 183 and the second control signal generator 186 may be defined as a second circuit unit.

Based on the externally input voltage Vin, the power voltage generator 187 generates a common voltage VCOM, a first positive power voltage VCC, a ground power voltage GND, a second positive power voltage VDD, a gate low voltage VGL, a gate high voltage VGH, and a third positive power voltage HVDD.

In accordance with the first power control signal CS1 output from the first control signal generator 185, the power voltage generator 187 stops outputting a first voltage group including VCOM, VCC, GND, VDD, VGL, and VGH from among all voltages to be output therefrom. In accordance with a second power control signal CS2 output from the second control signal generator 186, the power voltage generator 187 stops outputting a second voltage group including HVDD from among all voltages to be output therefrom. If the second voltage group including HVDD is cut off, a gamma voltage which is generated based on HVDD is also cut off.

In FIG. 7, "VL" denotes an internal logic voltage of the power supply 180, RST denotes a reset signal of a timing controller, "EN" denotes an operation activating signal of the power supply 180, and GMA denotes a gamma voltage. In addition, DLY0~DLY3 are delay time and their values may be changed according to settings of a device.

Due to the above configuration, when the power supply 180 is power off, the first voltage group including VCOM, VCC, GND, VDD, VGL, and VGH fall to a level of the ground power voltage GND by the first off signal (e.g., a UVLOF signal). In addition, the second voltage group including HVDD falls to the level of the ground power voltage GND by the second off signal (e.g., an HVDDOF signal) which occurs when a predetermined period of time has passed after the first off signal occurred. That is, unlike other voltages, the third positive power voltage HVDD is cut off (that is, falling to the level of the ground power voltage GND) after delay time DLYP.

In the experiment, the power supply 180 according to the first embodiment of the present disclosure is capable of solving the reverse voltage phenomenon which occurs to a gamma voltage GMA and the second positive power voltage VDD, as shown in FIG. 8 (VDD falls after delay time, just like DLY, so the reverse voltage phenomenon is solved). As a result, it was possible to prevent damage to a device, such as a data driver, or reliability failure which would occur due to the reverse voltage phenomenon.

Meanwhile, the first embodiment is a case where a single power supply generates and outputs all voltages. However, it is merely exemplary, and a plurality of power supplies may be provided depending on configuration, size, purpose, or effects of a device. An embodiment of a plurality of power supplies is hereinafter described in detail.

<Second Embodiment>

Figure 9:
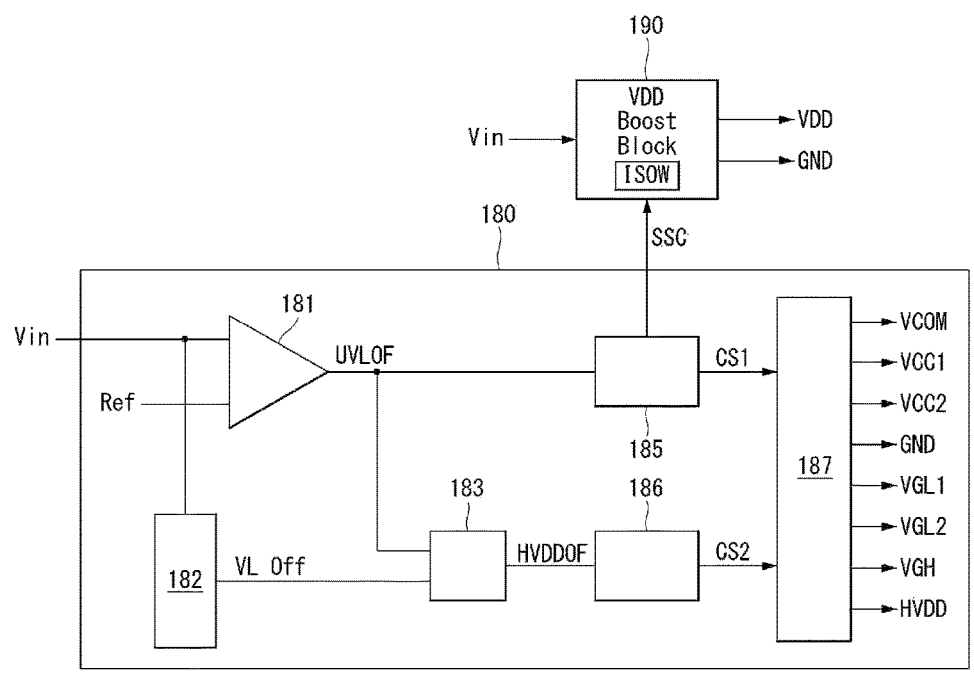
FIG. 9 is a block diagram illustrating part of a power supply according to a second embodiment of the present disclosure.
Figure 10:
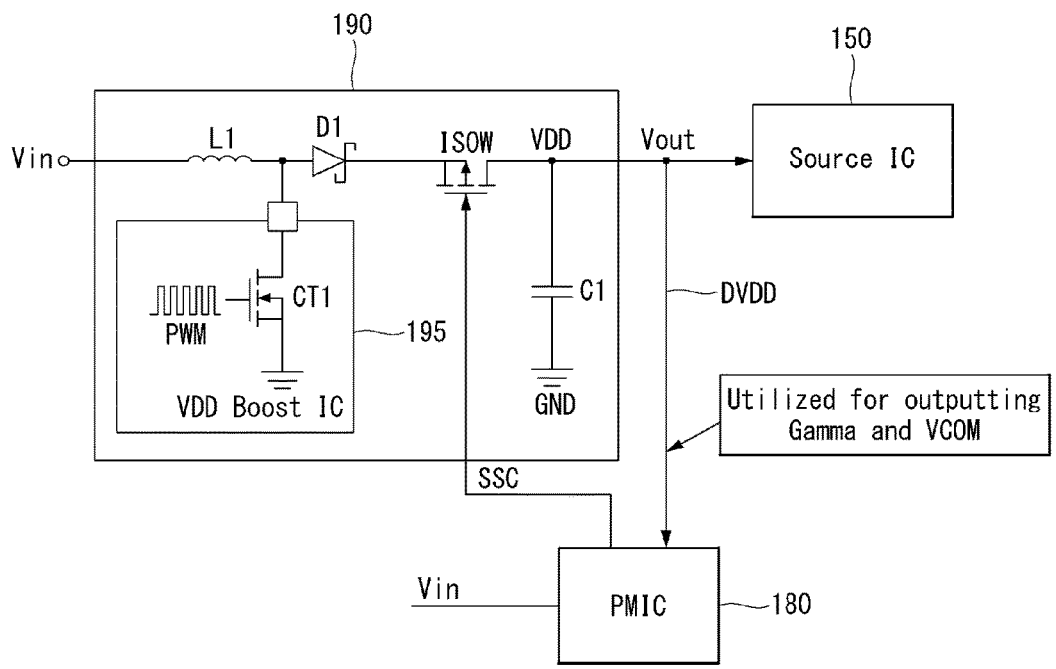
FIG. 10 is a diagram illustrating exemplary configurations of first and second power supplies according to the second embodiment of the present disclosure.
Figure 11:
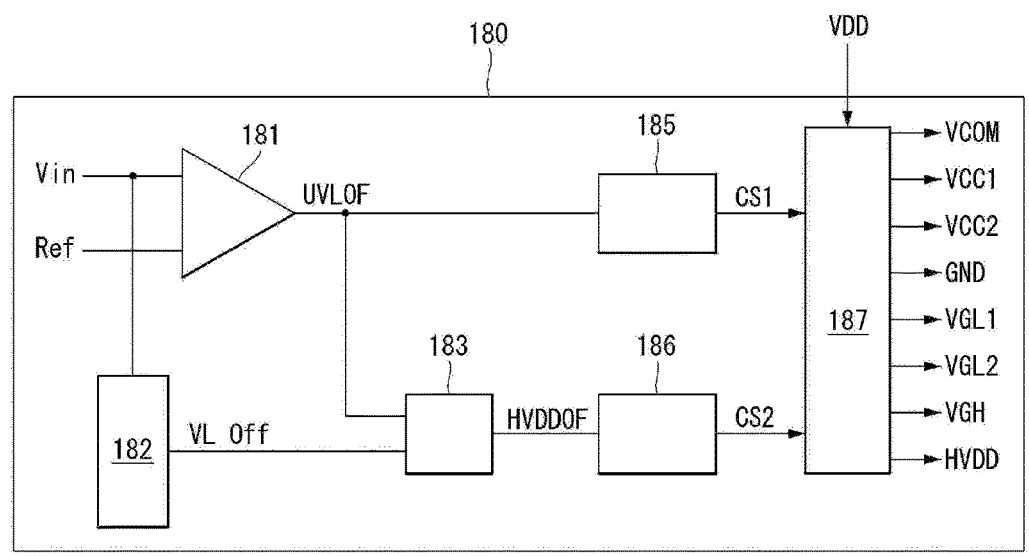
FIG. 11 is a diagram illustrating part of the first power supply according to the second embodiment of the present disclosure.
Figure 12:
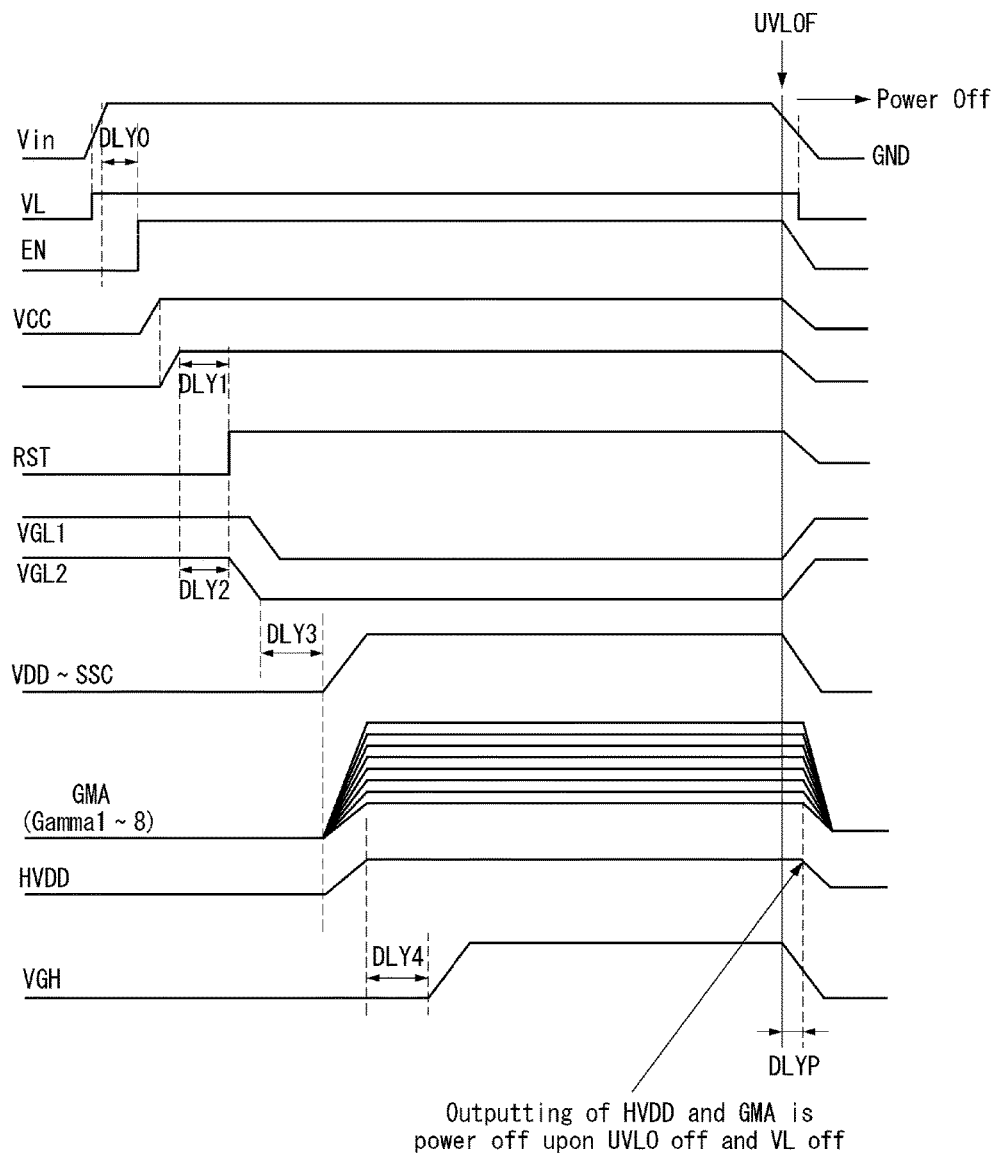
FIG. 12 is a waveform diagram illustrating power-off sequences shown when power supply according to the second embodiment of the present disclosure is power off.

FIG. 9 is a block diagram illustrating part of a power supply according to a second embodiment of the present disclosure; FIG. 10 is a diagram illustrating configuration of first and second power supplies according to the second embodiment of the present disclosure; FIG. 11 is a diagram illustrating part of the first power supply according to the second embodiment of the present disclosure; and FIG. 12 is a waveform diagram illustrating power-off sequences shown when the power supply according to the second embodiment of the present disclosure is power off As illustrated in FIGS. 9 to 12, a power supply according to the second embodiment of the present disclosure is divided to a first power supply 180 and a second power supply 190. Based on an externally input voltage Vin, the first power supply 180 may generate and output a common voltage VCOM, a first A positive power voltage (or a first collector voltage) VCC1, a first B positive power voltage (or a second collector voltage) VCC2, a ground voltage GND, a first A gate low voltage VGL1, a first B gate low voltage VGL2, a gate high voltage VGH, and a third positive power voltage (or a half drain voltage) HVDD. The second power supply 190 includes a power voltage generator which generates and outputs a second positive power voltage (or a drain voltage) VDD and a ground power voltage GND based on an externally input voltage Vin, The first power supply 180 includes an external voltage detector 181, a logic voltage generator 182, an internal voltage detector 183, a first control signal generator 185, a second control signal generator 186, and a power voltage generator 187.

The external voltage detector 181 detects whether an externally input voltage Vin is normally being input. The external voltage detector 181 compares an internally set reference voltage Ref with an externally input voltage Vin, and outputs a first off signal (e.g., a UVLOF signal) when the externally input voltage Vin falls to or below the internally set reference voltage Ref The external voltage detector 181 outputs the first off signal (UVLOF) when the externally input voltage Vin is cut off or falls to or below the internally set reference voltage Ref. For example, the first off signal (e.g., a UVLOF signal) may be configured to usually maintain a logic high level and switch from the logic high level to a logic log level when the externally input voltage Vin falls to or below the internally set reference voltage Ref Based on the externally input voltage Vin, the logic voltage generator 182 generates an internal logic voltage that drives an internal circuit of the power supply 180. The internal logic voltage generated by the logic voltage generator 182 is used to drive at least one of the external voltage detector 181, the internal voltage detector 183, the first control signal generator 185, the second control signal generator 186, and the power voltage generator 187.

The internal voltage detector 183 detects whether an internal logic voltage generated by the logic voltage generator 182 is normally being output. When the internal logic voltage output from the logic voltage generator 182 is cut off (VL Off), the internal voltage detector 183 generates a signal that controls the second control signal generator 186. For example, when the first off signal (e.g., a UVLOF signal) output from the eternal voltage detector 181 and the internal logic voltage output from the logic voltage generator 182 fall to a level corresponding to logic low, the internal voltage detector 183 may generate a signal that controls the second control signal generator 186.

In accordance with the first off signal (e.g., a UVLOF signal) of a logic low level output from the external voltage detector 181, the first control signal generator 185 outputs a first power control signal CS1 that stops the power voltage generator 187 from outputting voltages. In addition, in accordance with the first off signal (e.g., a UVLOF signal) of a logic low level output from the external voltage detector 181 the first control signal generator 185 outputs a third power control signal SSC that stops the second power supply 190 from outputting voltages.

In accordance with a second off signal (e.g. an HVDDOF signal) of a logic low level output from the internal voltage detector 183, the second control signal generator 186 outputs a second power control signal CS2 that stops the power voltage generator 187 from outputting voltages.

In accordance with the first power control signal CS1 output from the control signal generator 185, the power voltage generator 187 stops outputting the first voltage group including VCOM, VCC1, VCC2, GND, VGL1, VGL2, and VGH from among all voltages to be output therefrom. In accordance with the second power control signal CS2 output from the second control signal generator 186, the power voltage generator 187 stops outputting the second voltage group including HVDD from among all voltages to be output therefrom. If the second voltage group including HVDD is cut off, a gamma voltage which is generated based on HVDD is also cut off Being separate from the first power supply 180, the second power supply 190 stops outputting the voltages GND and VDD in accordance with the third power control signal SSC output from the first control signal generator 185 of the first power supply 180.

The second power supply 190 includes an inductor L1, a diode D1, a bust switch CT1, a separating switch ISOW, and a capacitor C1.

The inductor L1 is disposed in an input stage to which the externally input voltage Vin is supplied. The diode D1 includes an anode electrode connected to the rear side of the inductor L1, and a cathode electrode connected to an output stage Vout of the second power supply 190. The capacitor C1 includes one end connected to the output stage Vout of the second power supply 190, and the other end connected to the ground power voltage GND. The capacitor C1 may be defined as a capacitor for charging a counter electromotive force.

The boost switch CT1 includes a drain electrode connected to the inductor L1 and an anode electrode of the diode D1, and a source electrode connected to the ground power voltage GND. The boost switch CT1 is repeatedly turned on and off in accordance to a pulse width signal PWM. According to the switching operation of the boost switch CT1, a counter electromotive force may or may not be formed in the inductor L1. The boost switch CT1 may be provided as a boost IC 195.

The separating switch ISOW includes a first electrode connected to the cathode electrode of the diode D1, a second electrode connected to an output stage Vout of the second power supply 190, and a gate electrode connected to a control line through which the third power control signal SSC is transferred. The separating switch ISOW physically separates the cathode electrode of the diode D1 and the output stage Vout of the power supply 190.

The third power control signal SSC inactivates or turns off the separating switch ISOW of the second power supply 190. For example, if the second power control signal SSC of a logic low level is supplied to the separating switch ISOW of the second power supply 190, the cathode electrode side of the diode D1 and the output stage side Vout of the second power supply 190 are separated electrically. Thus, if the third power control signal of a logic low level is supplied to the separating switch ISOW of the second power supply 190, the voltages GND and VDD output from the second power supply 190 are cut off.

Meanwhile, the first power supply 170 receives the voltages GND and VDD output from the output stage Vout of the second power supply 190. The voltages GND and VDD output from the output stage Vout of the second power supply 190 are transferred to the power voltage generator 187 of the first power supply 180. That is, between the power voltage generator 187 of the first power supply 180 and the output stage Vout of the second power supply 190, there is formed a dummy power line DVDD which transfers the voltages GND and VDD output from the output stage Vout of the second power supply 190.

Based on the voltages GND and VDD output from the output stage Vout of the second power supply 190, the power voltage generator 187 of the first power supply 180 may output voltages VCOM and HVDD. It is because the voltages GND and VDD output from the output stage Vout of the second power supply 190 is of power voltage levels higher than that of the voltages VCOM and HVDD output from the output stage of the first power supply 180. In other words, the voltages GND and VDD output from the output stage Vout of the second power supply 190 fall to a level of the ground power voltage GND, after other voltages VCOM, VCC, and HVDD.

In this case, the power voltage generator 187 of the first power supply 180 generates a voltage based on the externally input voltage Vin or based on one of the voltages GND and VDD output from the output stage Vout of the second power supply 190. However, the power voltage generator 187 of the first power supply 180 generates a voltage based on one of the voltages GND and VDD output from the output stage Vout of the second power supply 190, after the first power supply 180 is power off.

FIG. 12, "VL" denotes an internal logic voltage of the first power supply 180, RST denotes a reset signal of a timing controller, "EN" denotes an operation activating signal of the power supply 180, and GMA denotes a gamma voltage. In addition, DLY0~DLY4 are delay time and their values may be changed according to settings of a device.

Due to the above configuration, when the first power supply 180 is power off, the first voltage group including VCOM, VCC1, VCC2, GND, VGL1 VGL2, and VGH falls to a level of the ground power voltage GND by the first off signal (e.g., a UVLOF signal). In addition, the second power supply 190 is also power off by the third power control signal SSC, and the voltages VDD and GND output from the second power supply 190 also fall to the level of the ground power voltage GND.

In addition, the second voltage group including HVDD falls to the level of the ground power voltage GND by a second off signal (e.g., an HVDDOF signal) which occurs after a predetermined period of time has passed after the first off signal (UVLOF) occurred. That is, unlike other voltages, the third positive power voltage HVDD is cut off (that is, falling to the level of the ground power voltage GND) after delay time DLYP.

In the experiment, even in the case where power generating devices, such as the power supplies 180 and 190, are physically separate, it is possible to solve the reverse voltage phenomenon occurring to a gamma voltage GMA and the second positive power voltage VDD. As a result, it was possible to prevent damage to a device, such as a data driver, or reliability failure, which would occur due to the reverse voltage phenomenon.

The aforementioned embodiments of the present disclosure have effects of solving the reverse voltage phenomenon by matching power off sequences of some voltages VDD, HVDD, and GMA output from a power supply included in a display device, such as a TV or a monitor. In addition, by solving the reverse voltage phenomenon, damage to a device, such as a data driver, and reliability failure may be prevented. The embodiments of the present disclosure include a data driver whose process condition is able to be easily changed from a condition for outputting a high voltage into a condition for outputting a low voltage, so it may improve design freedom and reduce costs.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A power supply, comprising:
   a logic voltage generator configured to generate an internal logic voltage based on an externally input voltage;
   a power voltage generator configured to generate a plurality of power voltages based on the externally input voltage
   a first circuit unit configured to output a first power control signal when the externally input voltage falls to or below an internally set reference voltage; and
   a second circuit unit configured to output a second power control signal when the internal logic voltage is cut off,
   wherein, when the externally input voltage is cut off, the power voltage generator stops outputting a drain voltage, and then stops outputting a half drain voltage, and
   wherein the power voltage generator stops outputting the drain voltage in accordance with the first power control signal, and then stops outputting the half drain voltage in accordance with the second power control signal.

2. The power supply of claim 1, wherein the half drain voltage falls to a level of a ground power voltage after a time delay, as compared to the drain voltage.

3. The power supply of claim 1, wherein:
   the first circuit unit comprises:
     an external voltage detector configured to compare the internally set reference voltage with the externally input voltage, and output a first off signal when the externally input voltage falls to or below the internally set reference voltage; and
     a first control signal generator configured to output the first power control signal in accordance with the first off signal output from the external voltage detector; and
   the second circuit unit comprises:
     an internal voltage detector configured to output the second off signal when the first off signal and the internal logic voltage fall to a level corresponding to logic low; and
     a second control signal generator configured to output the second power control signal in accordance with the second off signal output from the internal voltage detector.

4. A display device, comprising:
   a display panel configured to display an image;
   a data driver configured to supply a data signal to the display panel;
   a timing controller configured to control the data driver;
   a power supply comprising:
     a logic voltage generator configured to generate an internal logic voltage based on an externally input voltage; and
     a power voltage generator configured to generate a plurality of power voltages based on the externally input voltage;
   a first circuit unit configured to output a first power control signal when the externally input voltage falls to or below an internally set reference voltage; and
   a second circuit unit configured to output a second power control signal when the internal logic voltage is cut off,
   wherein, when the externally input voltage is cut off, the power supply is further configured to:
     stop outputting a drain voltage, and
     then, stop outputting a half drain voltage, and
   wherein the power voltage generator is further configured to:
     stop outputting the drain voltage in accordance with the first power control signal, and
     then, stop outputting the half drain voltage in accordance with the second power control signal.

5. The display device of claim 4, wherein the half drain voltage falls to a level of a ground power voltage after a time delay, as compared to the drain voltage.

6. The display device of claim 4, wherein:
   the first circuit unit comprises:
     an external voltage detector configured to compare the internally set reference voltage with the externally input voltage, and output a first off signal when the externally input voltage falls to or below the internally set reference voltage; and
     a first control signal generator configured to output the first power control signal in accordance with the first off signal output from the external voltage detector; and
   the second circuit unit comprises:
     an internal voltage detector configured to output the second off signal when the first off signal and the internal logic voltage fall to a level corresponding to logic low; and
     a second control signal generator configured to output the second power control signal in accordance with the second off signal output from the internal voltage detector.

7. A display device, comprising:
   a display panel configured to display an image;
   a data driver configured to supply a data signal to the display panel;
   a timing controller configured to control the data driver;
   a first power supply configured to comprise a logic voltage generator for generating an internal logic voltage based on an externally input voltage, and a power voltage generator for generating a half drain voltage based on the externally input voltage;
   a second power supply configured to comprise a power generator for generating a drain voltage based on the externally input voltage; and a dummy power line formed between the power voltage generator of the first power supply and an output stage of the second power supply, wherein, when the externally input voltage is cut off, the half drain voltage falls to a level of a ground power voltage after a time delay, as compared to the drain voltage, wherein, when the externally input voltage is cut off, the power voltage generator of the first power supply generates and outputs a voltage based on a voltage output from the output stage of the second power supply.

* * * * *